(No Model.)
R. A. DUNNING.
LETTER WEIGHING SCALE.
No. 512,168. Patented Jan. 2, 1894.
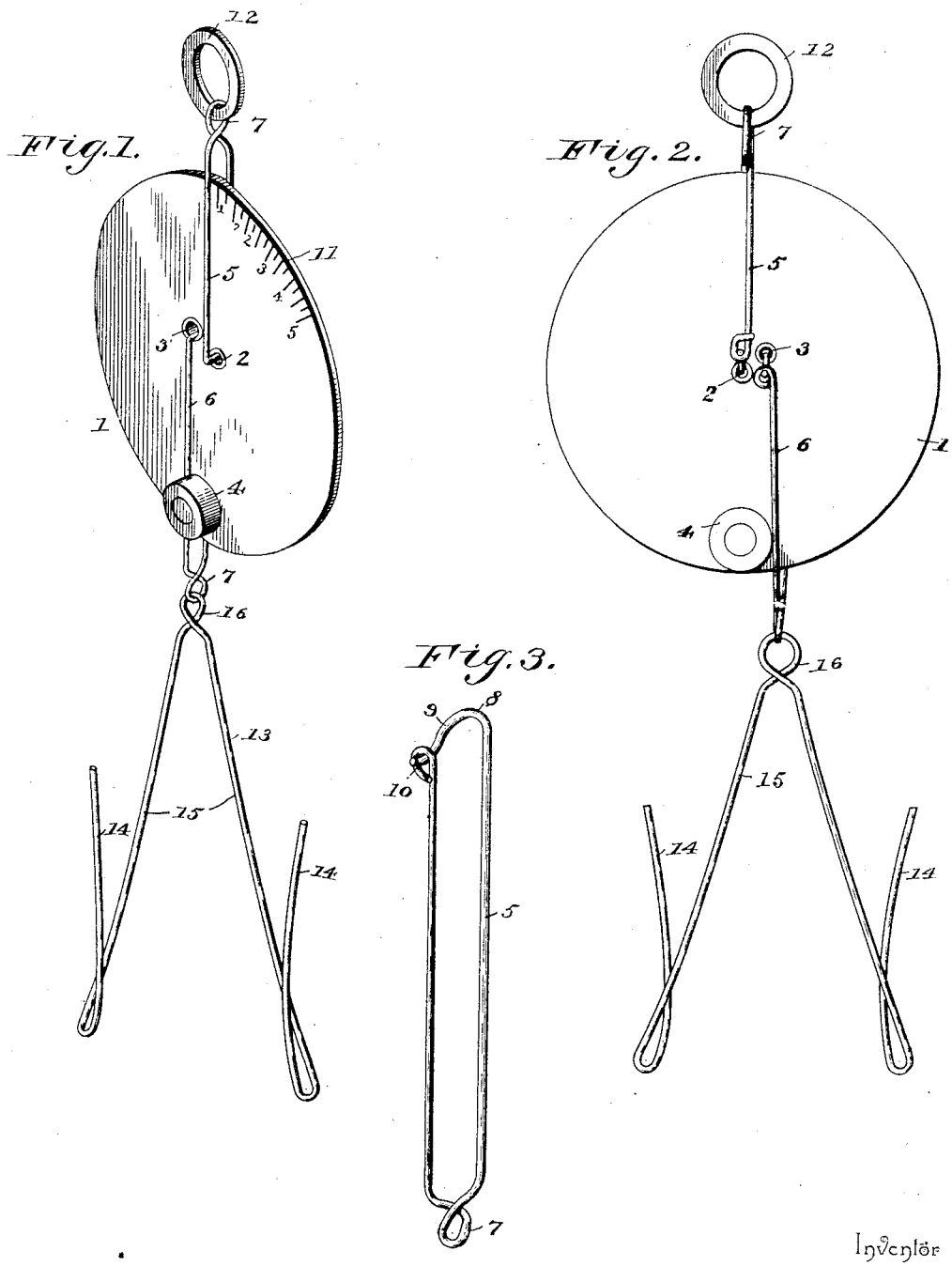
Witnesses
Inventor
Robert A. Dunning,
By his Attorneys,
C. A. Snow & Co.

UNITED STATES PATENT OFFICE.

ROBERT A. DUNNING, OF BATH, MAINE.

LETTER-WEIGHING SCALE.

SPECIFICATION forming part of Letters Patent No. 512,168, dated January 2, 1894.

Application filed July 15, 1893. Serial No. 480,642. (No model.)

*To all whom it may concern:*

Be it known that I, ROBERT A. DUNNING, a citizen of the United States, residing at Bath, in the county of Sagadahoc and State of Maine, have invented a new and useful Weighing-Scale, of which the following is a specification.

This invention relates to an improvement in weighing scales designed especially for weighing mail matter; and it has for its object to provide a simple and convenient device so constructed as to permit of the application thereto of advertising matter and information relating to postal regulations, such as rates for different classes of mail matter; and furthermore, to provide means whereby the parts of the device may be readily disconnected or folded for transportation.

Further objects and advantages of this invention will appear in the following description, and the novel features thereof will be particularly pointed out in the appended claim.

In the drawings: Figure 1 is a perspective view of a weighing apparatus embodying my invention. Fig. 2 is a rear view of the same. Fig. 3 is a detail view in perspective of one of the twin detachable loops.

Similar numerals of reference indicate corresponding parts in all the figures of the drawings.

The body portion 1 of the improved apparatus consists of a circular disk of cardboard or similar material provided adjacent to its center with eccentric perforations fitted with eyelets 2 and 3 to form bearings.

4 represents a weight which is fixed to the disk, near its periphery, in such a position that when the disk is supported by means of the bearing 2, the bearing 3 will occupy a position slightly above the plane thereof, as shown clearly in Fig. 1.

5 and 6 represent detachable loops, provided at their outer extremities with eyes 7 and having their free inner ends provided with terminal locking devices, one arm of each loop being provided with a segmental curve 8 and a hook 9, and the other arm thereof being provided with a ring-shaped keeper 10, to engage the hook. The segmental curved portions of the loops are adapted to extend through and engage the bearings in the disk, said keepers and hooks being engaged in rear of the disk to lock the loops in position. The disk is provided at its upper side with a peripheral scale 11, and the front side of the supporting loop 5 agrees with the zero mark of said scale when the parts are in their normal positions, as shown in Fig. 1. Engaged with the eye at the upper terminal of the loop 5 is a supporting ring 12, and engaged with the terminal eye of the loop 6 is a holder 13, formed of a single blank of wire and comprising the twin hooks 14, the inner sides 15 of which are connected by means of an eye 16, which is engaged with said terminal eye of the loop 6. The inner sides of the hooks comprising the holder diverge toward their lower ends, and the outer or free sides thereof are curved forwardly toward their upper ends to facilitate the insertion of mail matter between such free portions and the inner sides of the hooks. The entire face or front side of the disk may be utilized for advertising matter, and the rear side thereof may be provided, as indicated in Fig. 2, with postal regulations with regard to the rates for different classes of mail matter.

From the above description the operation of the improved weighing apparatus will be readily understood; and it will be observed, furthermore, that the device is simple in construction and may be inexpensively manufactured. The advertising space afforded by the front side or face of the disk may be utilized by merchants for cards, &c., and the simplicity of the construction will render it possible for merchants to distribute the device as an advertising medium. The detachability of the parts from the main body or disk permits of the removal thereof when it is desired to print advertising or other matter upon the disk; the readjustment of the parts being sufficiently simple to be accomplished by the consumer.

Various changes in the form, proportion, and the minor details of construction may be resorted to without departing from the principle or sacrificing any of the advantages of this invention.

Having described my invention, what I claim is—

A mail weighing apparatus, comprising a permanently-weighted scale-bearing disk provided with eccentric bearings 2 and 3, detachable loops 5 and 6 engaging said bearings and having their parallel arms provided with interlocking hooks and keepers 9 and 10, and further provided at their outer extremities with eyes 7, a finger-ring 11 engaging one of the eyes 7, and a holder 13 connected to the eye of the other loop, substantially as specified.

In testimony that I claim the foregoing as my own I have hereto affixed my signature in the presence of two witnesses.

ROBERT A. DUNNING.

Witnesses:
O. C. ROGERS,
WM. D. MUSSENDEN.